United States Patent
Yang et al.

(10) Patent No.: US 9,621,014 B2
(45) Date of Patent: Apr. 11, 2017

(54) TORQUE RIPPLE AND RADIAL FORCE REDUCTION IN DOUBLE-ROTOR SWITCHED RELUCTANCE MACHINES

(71) Applicant: McMaster University, Hamilton (CA)

(72) Inventors: Yinye Yang, Oakville (CA); Nigel Schofield, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 104 days.

(21) Appl. No.: 14/813,654

(22) Filed: Jul. 30, 2015

(65) Prior Publication Data

US 2016/0036366 A1 Feb. 4, 2016

Related U.S. Application Data (60) Provisional application No. 62/031,274, filed on Jul. 31, 2014.

(51) Int. Cl.

| | |
|---|---|
| *H02P 7/00* | (2016.01) |
| *H02K 16/02* | (2006.01) |
| *H02K 19/10* | (2006.01) |
| *H02K 29/03* | (2006.01) |
| *H02P 25/098* | (2016.01) |
| *H02P 101/45* | (2016.01) |

(52) U.S. Cl.
CPC .......... *H02K 16/02* (2013.01); *H02K 19/103* (2013.01); *H02K 29/03* (2013.01); *H02P 25/098* (2016.02); *H02P 2101/45* (2015.01)

(58) Field of Classification Search
CPC ...... H02P 25/08; H02P 25/082; H02P 25/085; H02K 19/103; B62D 5/0463

USPC ................. 318/701, 432, 461, 434
See application file for complete search history.

(56) References Cited

U.S. PATENT DOCUMENTS

| | | | |
|---|---|---|---|
| 5,386,162 A | 1/1995 | Horst | |
| 5,637,997 A * | 6/1997 | Hore | .............. G01D 5/2013 |
| | | | 324/207.16 |
| 5,936,373 A | 8/1999 | Li et al. | |
| 5,973,462 A | 10/1999 | Kalpathi et al. | |
| 5,986,418 A | 11/1999 | Horst et al. | |
| 6,028,385 A * | 2/2000 | Pengov | .............. H02K 19/103 |
| | | | 310/166 |

(Continued)

*Primary Examiner* — Rina Duda
(74) *Attorney, Agent, or Firm* — Bereskin & Parr LLP/S.E.N.C.R.L., s.r.l.

(57) ABSTRACT

A double-rotor switched reluctance machine includes a stator, a first rotor, and a second rotor. The stator and the first rotor operate as a first electric machine and the stator and the second rotor operate as a second electric machine. Each electric machine has an output torque profile that fluctuates periodically between a maximum and a minimum instantaneous torque. The double-rotor switched reluctance machine is configured so that when the first and second electric machines are operated at a common electrical frequency, the first and second maximum instantaneous torques are temporally offset, thereby reducing the overall torque ripple of the switched reluctance machine. Additionally, or alternatively, a double-rotor switched reluctance machine is configured so that the first and second rotors are radially offset from each other to reduce a net radial force imposed on the stator by the operation of the first and second electric machines.

20 Claims, 9 Drawing Sheets (56) References Cited

U.S. PATENT DOCUMENTS

| | | | | |
|---|---|---|---|---|
| 6,114,789 A * | 9/2000 | Pengov | ............... | H02K 19/103 |
| | | | | 310/166 |
| 6,257,027 B1 * | 7/2001 | Imai | ..................... | D06F 37/304 |
| | | | | 68/12.12 |
| 6,924,574 B2 * | 8/2005 | Qu | ....................... | H02K 21/222 |
| | | | | 310/112 |
| 7,026,742 B2 | 4/2006 | Miyake et al. | | |
| 7,259,493 B2 | 8/2007 | Oshidari et al. | | |
| 7,839,048 B2 | 11/2010 | Jansen et al. | | |
| 8,138,619 B2 * | 3/2012 | Gu | ....................... | F03D 7/0272 |
| | | | | 290/44 |
| 2004/0195929 A1 | 10/2004 | Oshidari et al. | | |
| 2011/0316366 A1 | 12/2011 | Abbasian et al. | | |
| 2013/0057091 A1 | 3/2013 | Kim et al. | | |
| 2014/0031168 A1 | 1/2014 | Yang et al. | | |
| 2014/0111038 A1 | 4/2014 | Yang et al. | | |

\* cited by examiner

Double-rotor configuration with displaced rotor position
FIG. 7C

Double-rotor configuration with eccentricity
FIG. 7B

Concentric double-rotor configuration
FIG. 7A

TORQUE RIPPLE AND RADIAL FORCE REDUCTION IN DOUBLE-ROTOR SWITCHED RELUCTANCE MACHINES

CROSS-REFERENCE TO RELATED APPLICATION

This application claims the benefit of U.S. Provisional Patent Application No. 62/031,274 filed Jul. 31, 2014, the contents of which are incorporated herein by reference.

FIELD

Embodiments disclosed herein relate generally to switched reluctance machines (SRMs), and more specifically to double-rotor switched reluctance machines (DRSRMs).

BACKGROUND

Hybrid vehicles (e.g. vehicles with more than one power source for supplying power to move the vehicle) may provide increased efficiency and/or increased fuel economy when compared to vehicles powered by a single internal combustion engine.

Switched reluctance motor (SRM) drives are gaining interest in hybrid (HEV) and Plug-in Hybrid Electric Vehicle (PHEV) applications due to their simple and rigid structure, four-quadrant operation, and extended-speed constant-power range. However, SRM drives generally suffer from high commutation torque ripple, typically resulting from poor tracking precision of phase current, nonlinear inductance profiles, and nonlinear torque-current-rotor position characteristics.

Switched reluctance machines typically include one stator and only one rotor. Typically, windings on the stator teeth generate an electromagnetic field so that the rotor in the electromagnetic field has the tendency to align with the stator to achieve maximum inductance. The rotor can be rotated by successively switching the stator excitation.

A double-rotor electric machine includes at least two rotors and one stator integrated into one machine set.

BRIEF DESCRIPTION OF THE DRAWINGS

For a better understanding of the described embodiments and to show more clearly how they may be carried into effect, reference will now be made, by way of example, to the accompanying drawings in which.

Further aspects and features of the embodiments described herein will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this

DESCRIPTION OF EXAMPLE EMBODIMENTS

Various systems or methods are described below to provide an example of an embodiment of each claimed invention. No embodiment described below limits any claimed invention and any claimed invention may cover systems and methods that differ from those described below. The claimed inventions are not limited to systems and methods having all of the features of any one system or method described below or to features common to multiple or all of the systems or methods described below. It is possible that a system or method described below is not an embodiment of any claimed invention. Any invention disclosed in a system or method described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Switched reluctance motor (SRM) drives are gaining interest in hybrid (HEV) and Plug-in Hybrid Electric Vehicle (PHEV) applications due to its simple and rigid structure, four-quadrant operation, and extended-speed constant-power range. SRM drives have generally been considered to be reliable and cost effective in harsh environments due to, for example, the absence of windings and permanent magnet on the rotor. But SRM drives generally suffer from high commutation torque ripple, typically resulting from poor tracking precision of phase current, nonlinear inductance profiles, and nonlinear torque-current-rotor position characteristics.

Typical switched reluctance machines include one stator and only one rotor. A double-rotor electric machine includes at least two rotors and one stator integrated into one machine set. Advantageously, a double-rotor switched reluctance machine as described herein may have a high power density, a compact volume and size, and/or lower manufacturing costs as compared to two separate electric machines. For example, the integration of two rotors and a stator has the advantage of reducing the need for another set of stator, machine housing, cooling system, etc., and thus may reduce the overall assembly volume at the same power level.

A double-rotor switched reluctance machine may be operated as two individual switched reluctance machines by utilizing the double rotors separately. Alternatively, a double-rotor switched reluctance machine may be operated as one machine by synchronizing the operation of the two rotors. This may have the advantage of enhanced power density as compared with a single-rotor switched reluctance machine. Alternatively, a double-rotor switched reluctance machine may be configured to selectively operate either as two individual switched reluctance machines or as one switched reluctance machine (e.g. by selectively synchronizing the rotors).

A double-rotor switched reluctance machine includes two rotors rotating concentrically with the same stator. In the embodiments illustrated herein, the stator is nested concentrically between the two rotors so that each of the rotors forms a conventional switched reluctance machine with the stator, i.e., the outer rotor and the stator form the outer switched reluctance machine while the interior rotor and the stator form the inner switched reluctance machine. However, the apparatus and methods disclosed herein may also be applied to double-rotor switched reluctance machines having different configurations.

For example, in alternative configurations, one of the rotors may be nested between the stator and the other rotor so that the middle rotor and stator form a conventional switched reluctance machine while the middle rotor and the other rotor together form a "floating-stator" switched reluctance machine. A "floating-stator" means that the "stator" is actually rotatable and the relative motion between the two rotors defines the magnetic field of the second switched reluctance machine. In some cases, the machine members are installed concentrically in a radial direction. In some other cases, the double rotors and the one stator are installed in a split pattern so that smaller radial diameter can be realized. These and various other configurations are described in U.S. Patent Publication 2014/0111038 A1, the contents of which are incorporated herein by reference.

Noise and vibration are typical issues for switched reluctance machines. In many cases, one or both of these issues result from the relatively high torque ripple of a conventional switched reluctance machine. Generally speaking, torque ripple is the result of variations in the instantaneous output torque based on, among other things, the relative angular position of the rotor poles relative to the stator poles. This results in periodic fluctuations in the output torque as the motor shaft rotates. Torque ripple may be defined as:

$$T_{rip} = \frac{T_{max} - T_{min}}{T_{av}} \quad (1)$$

where $T_{av}$, $T_{max}$, and $T_{min}$, are the average torque, maximum torque, and minimum torque, respectively.

In conventional switched reluctance machines with one stator and only one rotor, torque ripple may be reduced in a number of ways, including e.g. modifying the physical design of the rotor and/or stator (e.g. shaping the machine pole teeth topologies), controlling the phase current profile, and using SRM drives with torque sharing functions selected to improve the torque-speed capability of the switched reluctance machine.

As disclosed herein, another way to reduce or eliminate torque ripple from a machine design perspective can be applied to a double-rotor switched reluctance machine topology. In order to reduce the torque ripple, the inner rotor and the outer rotor may be synchronized during operation such that the torque waveforms produced by the two electric machines have the same electrical frequency and thus a constant phase difference exists between the two torque waveforms. By adjusting the relative positions of the two torque waveforms, e.g. by adjusting the relative rotor positions, a low instantaneous torque output of one machine can be matched to occur simultaneously with a high instantaneous torque of the other machine, and vice versa. Put another way, the relative rotor positions can be adjusted so that the two torque output waveforms compensate each other and thus the overall torque ripple for the double-rotor switched reluctance machine may be reduced.

In accordance with this broad aspect, there is provided a double-rotor switched reluctance machine comprising: a stator, a first rotor, and a second rotor; the stator and the first rotor configured to operate as a first electric machine having an output torque profile that, for a first average output torque, fluctuates periodically between a first maximum instantaneous torque and a first minimum instantaneous torque as the first rotor rotates relative to the stator; the stator and the second rotor configured to operate as a second electric machine having an output torque profile that, for a second average output torque, fluctuates periodically between a second maximum instantaneous torque and a second minimum instantaneous torque as the second rotor rotates relative to the stator; the double-rotor switched reluctance machine configured so that when the first and second electric machines are operated at a common electrical frequency, the first and second maximum instantaneous torques are temporally offset, thereby reducing an overall torque ripple of the double-rotor switched reluctance machine.

In some embodiments, when the first and second electric machines are operated at the common electrical frequency, the first maximum instantaneous torque and the second minimum instantaneous torque are substantially temporally concurrent.

In some embodiments, the first rotor is coupled to the second rotor so that the first and second electric machines operate at the common electrical frequency.

In some embodiments, the first rotor is coupled to the second rotor so that the first and second electric machines operate at a common rotational speed.

In some embodiments, the double-rotor switched reluctance machine further comprises a controller for controlling the first and second electric machines, the controller operable to selectively synchronize the first and second electric machines to operate at the common electrical frequency.

In some embodiments, the controller comprises a first controller for controlling the first electric machine, and a second controller for controlling the second electric machine.

In some embodiments, the second rotor is nested within the first rotor.

In some embodiments, the first rotor is nested within the stator.

In some embodiments, the stator is nested between the first rotor and the second rotor.

In some embodiments, the double-rotor switched reluctance machine is further configured so that when the first and second electric machines are operated at a common rotational speed, the first and second rotors are radially offset from each other by a predetermined offset angle selected to reduce a net radial force imposed on the stator by the operation of the first and second electric machines.

In some embodiments, the predetermined offset angle is selected to minimize the net radial force imposed on the stator by the operation of the first and second electric machines.

Also in accordance with this broad aspect, there is provided a method for controlling a double rotor switched reluctance machine comprising a stator, a first rotor, and a second rotor, the stator and the first rotor configured to operate as a first electric machine, and the stator and the second rotor configured to operate as a second electric machine, the method comprising: operating the first electric machine at an electrical frequency to generate a first average output torque, the first electric machine having an output torque profile that fluctuates periodically between a first maximum instantaneous torque and a first minimum instantaneous torque as the first rotor rotates relative to the stator; operating the second electric machine at the electrical frequency to generate a second average output torque, the second electric machine having an output torque profile that fluctuates periodically between a second maximum instantaneous torque and a second minimum instantaneous torque as the second rotor rotates relative to the stator; and synchronizing the operation of the first and second electric machines so that the first and second maximum instantaneous torques are temporally offset, thereby reducing an overall torque ripple of the double-rotor switched reluctance machine.

In some embodiments, synchronizing the operation of the first and second electric machines comprises operating the first and second electric machines so that the first maximum instantaneous torque and the second minimum instantaneous torque are substantially temporally concurrent.

In some embodiments, synchronizing the operation of the first and second electric machines comprises coupling the first rotor to the second rotor so that the first and second electric machines operate at the same electrical frequency.

In some embodiments, synchronizing the operation of the first and second electric machines comprises using a controller operable to selectively synchronize the first and second electric machines to operate at the same electrical frequency.

In some embodiments, the method further comprises synchronizing the operation of the first and second electric machines so that the first and second rotors are radially offset from each other by a predetermined offset angle selected to reduce a net radial force imposed on the stator by the operation of the first and second electric machines.

Another typical cause of noise and vibration in conventional switched reluctance machines is a relatively high radial force. Generally speaking, this radial force is typically a result of an eccentricity (e.g. non-concentricity) of the machine rotor stator assembly, although it may also be the result of variations and/or asymmetries in the stator and/or rotor. For example, if the air gap between the stator and rotor is not perfectly uniform, the location with the smaller air gap distance will yield a higher radial force pulling the rotor towards the stator, resulting in a net radial force on the machine. As the rotor rotates relative to the stator, the location of the higher radial force will also rotate. This results in a rotating net force on the machine as the motor shaft rotates.

As disclosed herein, the net radial force may be reduced or eliminated from a double-rotor switched reluctance machine topology. In order to reduce the radial force, the inner rotor and the outer rotor may be synchronized during operation such that the radial forces from each machine at least partially cancel each other out, and thus the overall radial force for the double-rotor switched reluctance machine may be reduced.

In accordance with this broad aspect, there is provided a double-rotor switched reluctance machine comprising: a stator, a first rotor, and a second rotor, the stator and the first rotor configured to operate as a first electric machine, and the stator and the second rotor configured to operate as a second electric machine; the double-rotor switched reluctance machine configured so that when the first and second electric machines are operated at a common rotational speed, the first and second rotors are radially offset from each other by a predetermined offset angle selected to reduce a net radial force imposed on the stator by the operation of the first and second electric machines.

In some embodiments, the predetermined offset angle is selected to minimize the net radial force imposed on the stator by the operation of the first and second electric machines.

Also in accordance with this broad aspect, there is provided a method for controlling a double rotor switched reluctance machine comprising a stator, a first rotor, and a second rotor, the stator and the first rotor configured to operate as a first electric machine, and the stator and the second rotor configured to operate as a second electric machine, the method comprising: operating the first electric machine and the second electric machine at a common rotational speed; and synchronizing the operation of the first and second electric machines so that the first and second rotors are radially offset from each other by a predetermined offset angle selected to reduce a net radial force imposed on the stator by the operation of the first and second electric machines.

In some embodiments, the predetermined offset angle is selected to minimize the net radial force imposed on the stator by the operation of the first and second electric machines.

These and other aspects and features of various embodiments will be described in greater detail below. While some examples discussed herein are directed to double-rotor SRMs for hybrid vehicle applications, it will be appreciated that the torque-ripple and/or radial force reduction techniques disclosed herein may be applied to any type of double-rotor SRM drive and/or any type of double-rotor electric machine.

Furthermore, it will be appreciated by a person skilled in the art that a method or apparatus disclosed herein may embody any one or more of the features contained herein and that the features may be used in any particular combination or sub-combination.

Figure 1A:
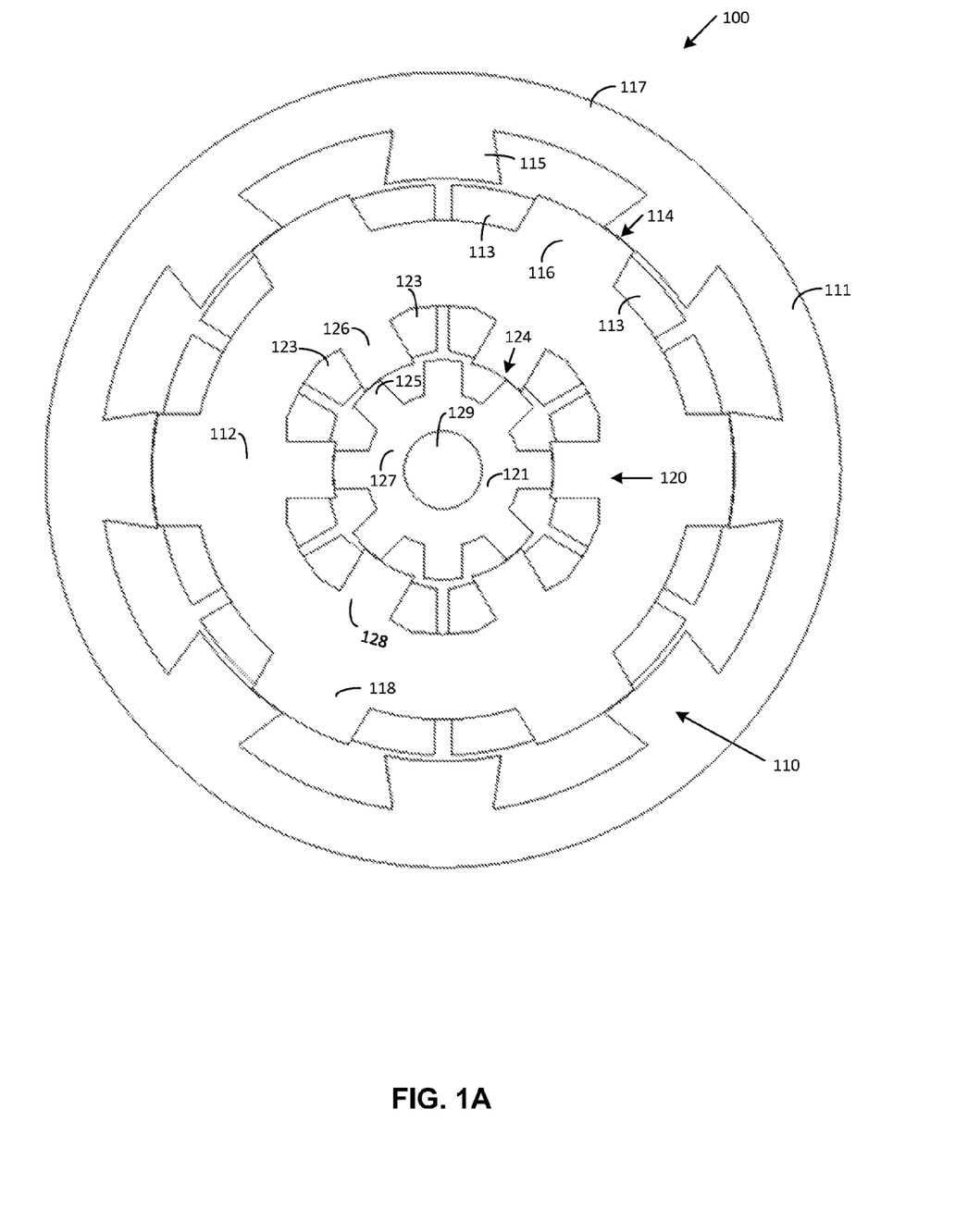
FIG. 1A is a schematic axial cross-section view of a double-rotor switched reluctance machine.

Reference is now made to FIG. 1A, which illustrates a schematic axial cross-section of an example double-rotor switched reluctance machine 100. Double-rotor switched reluctance machine 100 includes an exterior rotor 111, an interior rotor 121, and a stator 112 nested concentrically between the exterior rotor 111 and the interior rotor 121. Exterior and interior rotors 111, 121 each rotate coaxially about output shaft 129, while stator 112 typically does not rotate relative to the machine housing.

In the illustrated example, stator 112 is shared by both the exterior rotor 111 and the interior rotor 121. Specifically, stator 112 and exterior rotor 111 form an exterior switched reluctance machine, referred to generally as 110, and stator 112 and interior rotor 121 form an interior switched reluctance machine, referred to generally as 120.

The exterior side of the stator 112 is salient with exterior stator poles 116 and the interior side of the stator 112 is salient with interior stator poles 126. This may allow the switched reluctance machine 100 to achieve a higher aligned inductance to unaligned inductance ratio so that a higher torque density and a higher power density can be realized.

Exterior switched reluctance machine 110 includes exterior rotor 111, an exterior side of the stator 112, and exterior stator coils 113. The exterior rotor 111 is also salient with rotor poles 115. An air gap 114 is formed between the rotor poles 115 and the exterior stator poles 116.

In the illustrated example, exterior stator poles 116 have coil windings 113 to selectively generate magnetic fields. In this example, there are no coil windings on the rotor poles 115. The exterior coil windings 113 generate magnetic flux through the exterior stator poles 116. The flux penetrates the air gap 114 between the exterior stator poles 116 and the rotor poles 115 and then goes into the exterior rotor 111. The flux between the exciting or energized exterior stator poles 116 and the corresponding rotor poles 115 tends to align the rotor poles 115 with the exciting exterior stator poles 116 so that the rotor rotates.

Exterior rotor 111 can be continuously rotated by successively switching the stator excitation. For example, exciting stator coil windings 113 to change phase from one pole to another in sequence according to the angular position of rotor 111 urges the exterior machine to keep rotating. The flux then splits by half into the back iron 117 of the exterior rotor 111 and merges again at the other end of the rotor pole 115. The flux then again goes through the rotor pole 115, the air gap 114, and the exterior stator pole 116 on the other side of the exterior rotor 111. Eventually, the flux splits again in the exterior stator back iron 118 and merges at the base of the exterior stator pole 116 where the flux is generated.

Interior switched reluctance machine 120 includes an interior rotor 121, an interior side of the stator 112, and interior stator poles 126. The interior rotor 121 is also salient with rotor poles 125. An air gap 124 is formed between the rotor poles 125 and the interior stator poles 126.

In the illustrated example, the interior stator poles 126 have interior coil windings 123 to selectively generate magnetic fields. In this example, there are no coil windings around the interior rotor poles 125. The interior coil windings 123 generate magnetic flux through the interior stator poles 126. The flux penetrates the air gap 124 between the interior stator poles 126 and the interior rotor poles 125 and then goes into the interior rotor 121. The flux between the exciting stator poles 126 and the corresponding rotor poles 125 tends to align the interior rotor poles 125 with the exciting interior stator poles 126 so that the rotor rotates.

Interior rotor 121 can be continuously rotated by successively switching the stator excitation. For example, exciting stator coil windings 123 to change phase from one pole to another in sequence according to the angular position or rotor 121 urges the interior machine to keep rotating. The flux then splits by half into the back iron 127 of the interior rotor 121 around the interior shaft 129 and merges again at the other end of the interior rotor pole 125 of the interior rotor 121. The flux then again goes through the interior rotor pole 125, the interior air gap 124, and the interior stator pole 126 on the other side of the interior rotor 121. Eventually, the flux splits in the interior stator back iron 128 and merges at the base of the interior stator pole 126 where the flux is generated.

The flux paths described above for the exterior switched reluctance machine 110 and the interior switched reluctance machine 120, and in the application overall, are for illustration purposes only. In fact, there may be neither a starting point nor an ending point of the flux path. The whole flux path may be an entire loop formed by the entire exterior switched reluctance machine 110 and the entire interior switched reluctance machine 120. By having the coil windings 113 and 123 only around the exterior stator poles 116 and interior stator poles 126, respectively, the switched reluctance machine 100 may advantageously have a relatively simple construction.

In some embodiments, each electric machine 110, 120 may be independently selectively operable as either an electric motor or as an electric generator. When operating as an electric motor, the electric machine is capable of converting electrical energy (from e.g. a battery, a capacitor, or other power source) into mechanical energy to produce an output power (or torque). When operating as an electric generator, the electric machine is capable of converting mechanical energy (from e.g. a shaft or other mechanical input) into electrical energy, which may be transferred to e.g. a battery, a capacitor, or other power source.

Exterior rotor 111 and interior rotor 121 are concentrically aligned so that they share the same rotating axis. Stator 112 is designed so that the flux paths described above are independently functioning without major flux coupling and the exterior switched reluctance machine 110 and the interior switched reluctance machine 120 work independently. Optionally, an insulation layer may be provided in the stator 112 between the exterior switched reluctance machine 110 and the interior switched reluctance machine 120 to separate the flux paths of the two switched reluctance machines.

Figure 1B:
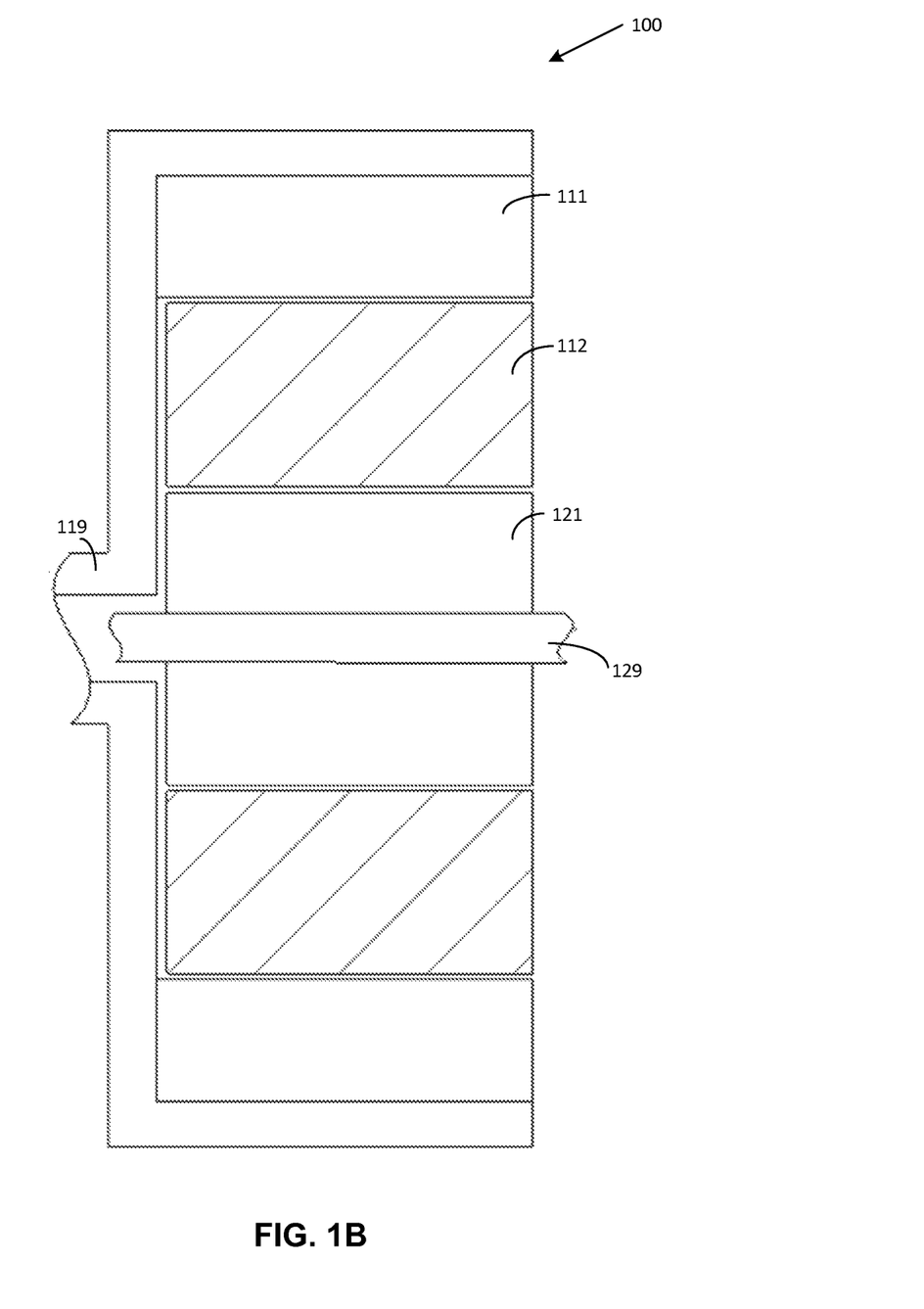
FIG. 1B is a schematic longitudinal cross-section view of the double-rotor switched reluctance machine of FIG. 1A.

Reference is next made to FIG. 1B, which illustrates a schematic longitudinal cross-section of double-rotor switched reluctance machine 100. Double-rotor switched reluctance machine 100 provides two mechanical output paths: one from the exterior rotor 111, and the other from the interior rotor 121. The exterior rotor 111 is coupled to an exterior shaft 119, and the interior rotor 121 is coupled to an interior shaft 129. In the illustrated example, rotor 111 and shaft 119 are integrally formed, as are rotor 121 and shaft 129. It will be appreciated that the rotors may alternatively be coupled using any suitable method, such as a threaded coupling, a keyed joint, welding, adhesives, and the like.

In the illustrated configuration, both the exterior and interior rotors 111, 121 (and accordingly the two output shafts 119, 129) can be controlled independently by the exterior switched reluctance machine 110 and the interior switched reluctance machine 120, respectively.

As illustrated in FIG. 1B, exterior output shaft 119 is positioned at one end of the double-rotor switched reluctance machine, while the interior output shaft 129 has terminal ends at both ends of machine 100. In alternative embodiments, output shafts 119 and 129 may have a different number of terminal ends, e.g. terminal ends for one or both output shafts may be provided at one or both ends of machine 100.

In the example illustrated in FIG. 1A, double-rotor switched reluctance machine 100 has six exterior stator poles 116 and eight exterior rotor poles 115. Accordingly, exterior switched reluctance machine 110 may be characterized as a 6/8 switched reluctance machine. Double-rotor switched reluctance machine 100 also has six interior stator poles 126 and eight interior rotor poles 125. Accordingly, interior switched reluctance machine 120 may also be characterized as a 6/8 switched reluctance machine. However, it will be appreciated that the number of rotor and stator poles are for illustration only, and that alternative embodiments of double-rotor switched reluctance machine 100, the interior and exterior electric machines may have any number of stator poles, rotor poles, and coil windings.

Figure 2:
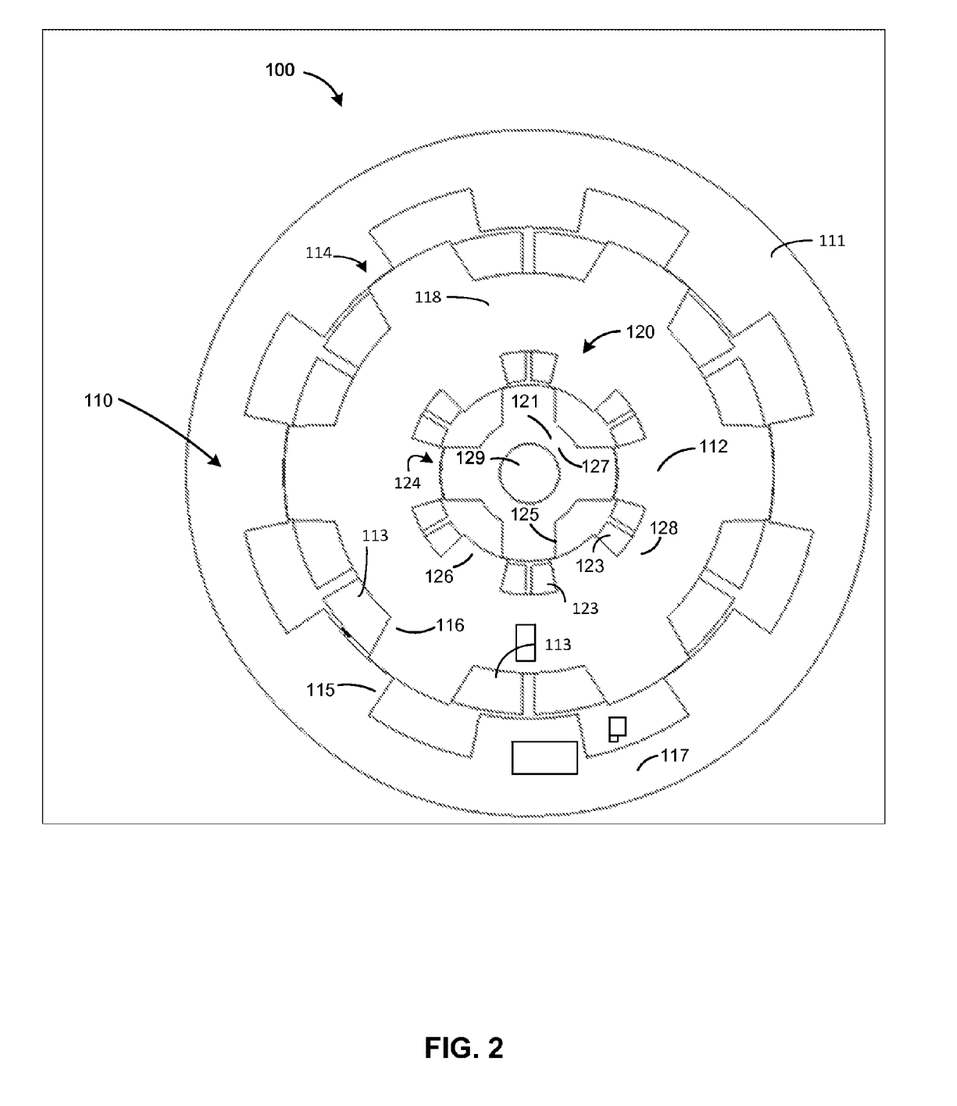
FIG. 2 is a schematic axial cross-section view of another double-rotor switched reluctance machine.

For example, in some embodiments other pole pair patterns, such as stator pole to rotor pole ratios, of 6/4, 8/6, 6/8, 6/10, 12/8, 8/14, etc., may be used. Also, the number of stator and rotor poles for the interior and exterior electric machines may be the same or may be different. FIG. 2 illustrates a schematic axial cross-section example of another double-rotor switched reluctance machine 100, in which exterior switched reluctance machine 110 has six exterior stator poles 116 and eight exterior rotor poles 115 (and may therefore be characterized as a 6/8 SRM), and interior switched reluctance machine 120 has six interior stator poles 126 and four interior rotor poles 125 (and may therefore be characterized as a 6/4 SRM).

In order to reduce or eliminate the torque ripple of a double-rotor switched reluctance machine 100, the inner rotor and the outer rotor may be synchronized during operation such that the output torque profile (i.e. instantaneous torque as a function of the rotational angle of the rotor) for each of the two electric machines 110, 120 have the same electrical frequency, and thus a constant phase difference exists between the respective minimum and maximum instantaneous torque for the first and second electrical machines.

Figure 3A:
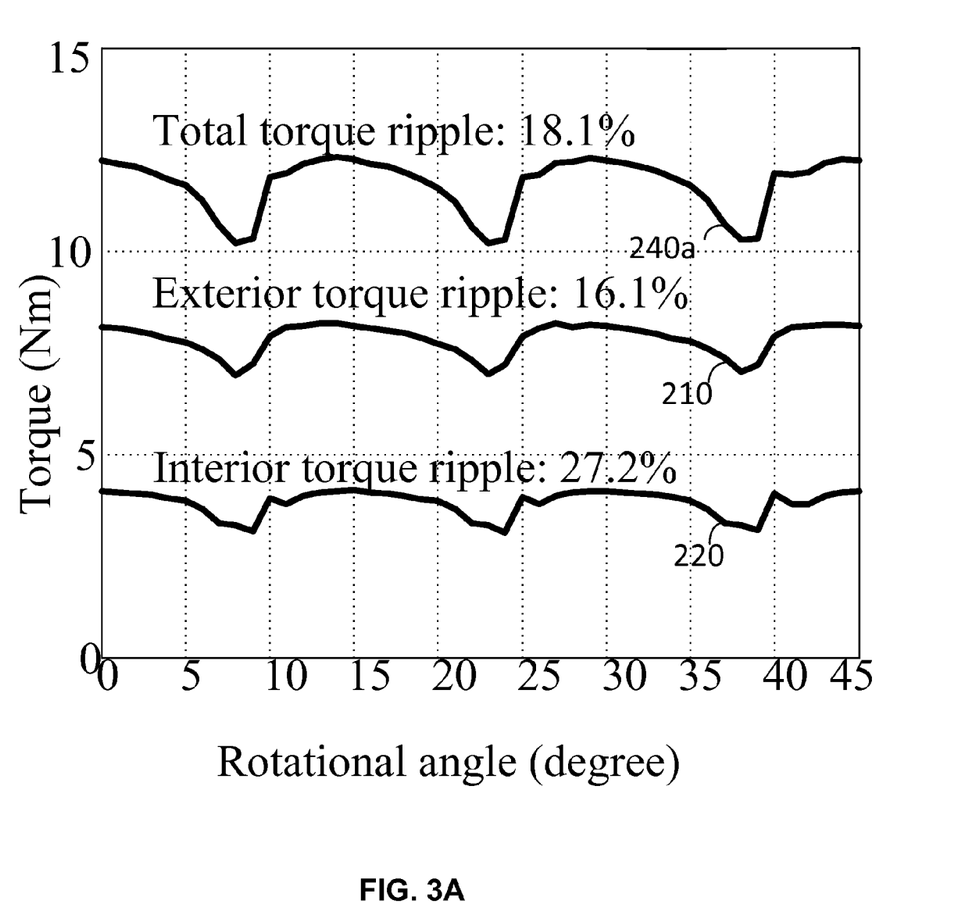
FIG. 3A is an example of output torque profiles for an interior electric machine, an exterior electric machine, and a resultant total output torque profile for a double-rotor electric machine, in which the output torque profiles for the interior and exterior electric machines are in-phase.

FIG. 3A is an example of an output torque profile 220 for an interior electric machine 120, an output torque profile 210 for an exterior electric machine 110, and the resultant total output torque profile 240a for the double-rotor electric machine 100. As is typical for switched reluctance machines, each output torque profile 210, 220 fluctuates periodically between a maximum instantaneous torque and a minimum instantaneous torque as the rotor for that machine rotates relative to the stator.

In FIG. 3A, the output torque profiles 210, 220 may be characterized as in-phase, as the maximum instantaneous torque for electric machine 110 occurs substantially simultaneously (i.e. is substantially temporally aligned) with the maximum instantaneous torque for electric machine 120, and the minimum instantaneous torque for electric machine 110 occurs substantially simultaneously (i.e. is substantially temporally aligned) with the minimum instantaneous torque for electric machine 120.

By adjusting the relative positions of the two output torque profiles, a relatively low instantaneous torque output of one electric machine can be matched to occur simultaneously with a relatively high instantaneous torque of the other electric machine, and vice versa. Put another way, double-rotor electric machine 100 can be configured so that the two torque output waveforms of electric machines 110, 120 at least partially compensate or offset each other and thus the overall torque ripple for the double-rotor switched reluctance machine 100 may be reduced.

Figure 3B:
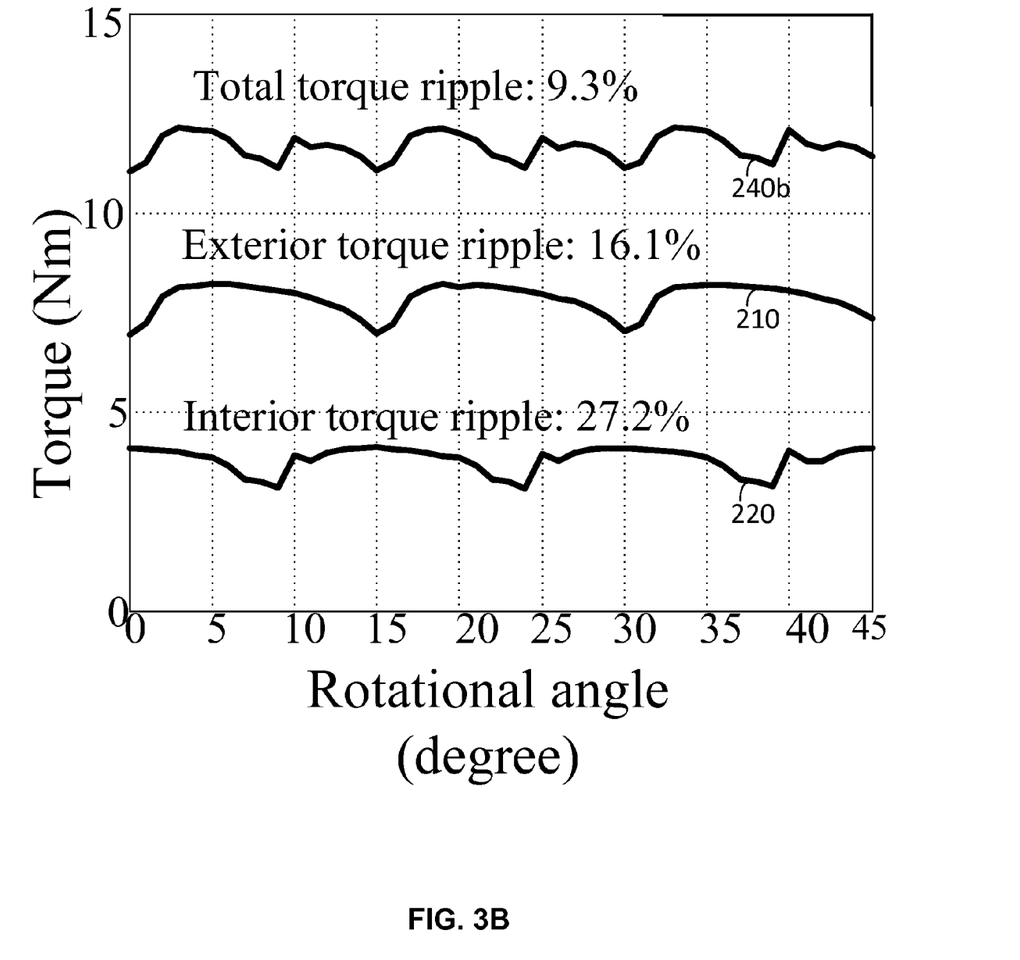
FIG. 3B is an example of output torque profiles for an interior electric machine, an exterior electric machine, and a resultant total output torque profile for a double-rotor electric machine in accordance with an example embodiment, in which the output torque profiles for the interior and exterior electric machines are offset.

For example, the output torque profiles 210, 220 shown in FIG. 3B may be characterized as out-of-phase, as the maximum instantaneous torque for electric machine 110 occurs substantially simultaneously (i.e. is substantially temporally aligned) with the minimum instantaneous torque for electric machine 120, and the minimum instantaneous torque for electric machine 110 occurs substantially simultaneously (i.e. is substantially temporally aligned) with the maximum instantaneous torque for electric machine 120. Put another way, the maximum instantaneous torques for electric machines 110, 120 are temporally offset, which results in a 'flatter' overall output torque profile 240b (i.e. less overall torque ripple) for the double-rotor switched reluctance machine 100.

Figure 4:
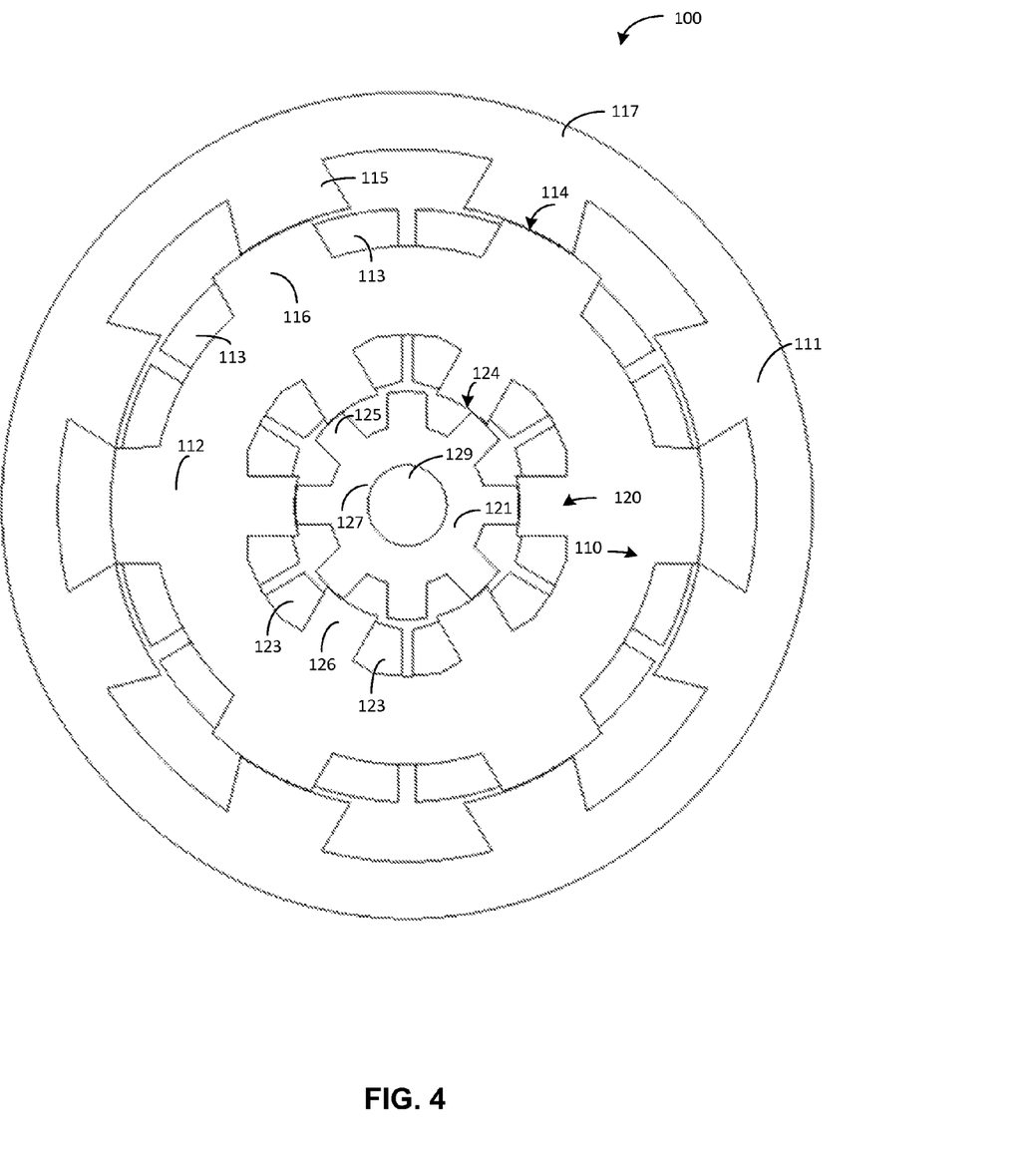
FIG. 4 is a schematic axial cross-section view of a double-rotor switched reluctance machine in accordance with an example embodiment.

One way in which the output torque profiles of the electric machines 110, 120 can be adjusted to at least partially compensate or offset each other is by adjusting the relative angular position of rotors 111, 121 during operation of the first and second electric machines 110, 120. For example, in FIG. 1A both the exterior and interior switched reluctance machines 110, 120 are 6/8 switched reluctance machines. Also, rotor poles 115 are generally radially aligned with rotor poles 125. Operating electric machines 110, 120 at the same electrical frequency and with the rotors 111, 121 in the relative position shown in FIG. 1A may result in output torque profiles for electric machines 110, 120, and an overall torque profile for the double-rotor switched reluctance machine 100 as shown in FIG. 3A. However, as shown in FIG. 4, rotor poles 115 may be generally radially aligned with the gaps between rotor poles 125. In other words, the rotor poles 115, 125 are radially offset (i.e. not radially aligned). Operating electric machines 110, 120 at the same electrical frequency and with the rotors 111, 121 in the relative position shown in FIG. 4 may result in output torque profiles for electric machines 110, 120, and an overall torque profile for the double-rotor switched reluctance machine 100 as shown in FIG. 3B.

Figure 5:
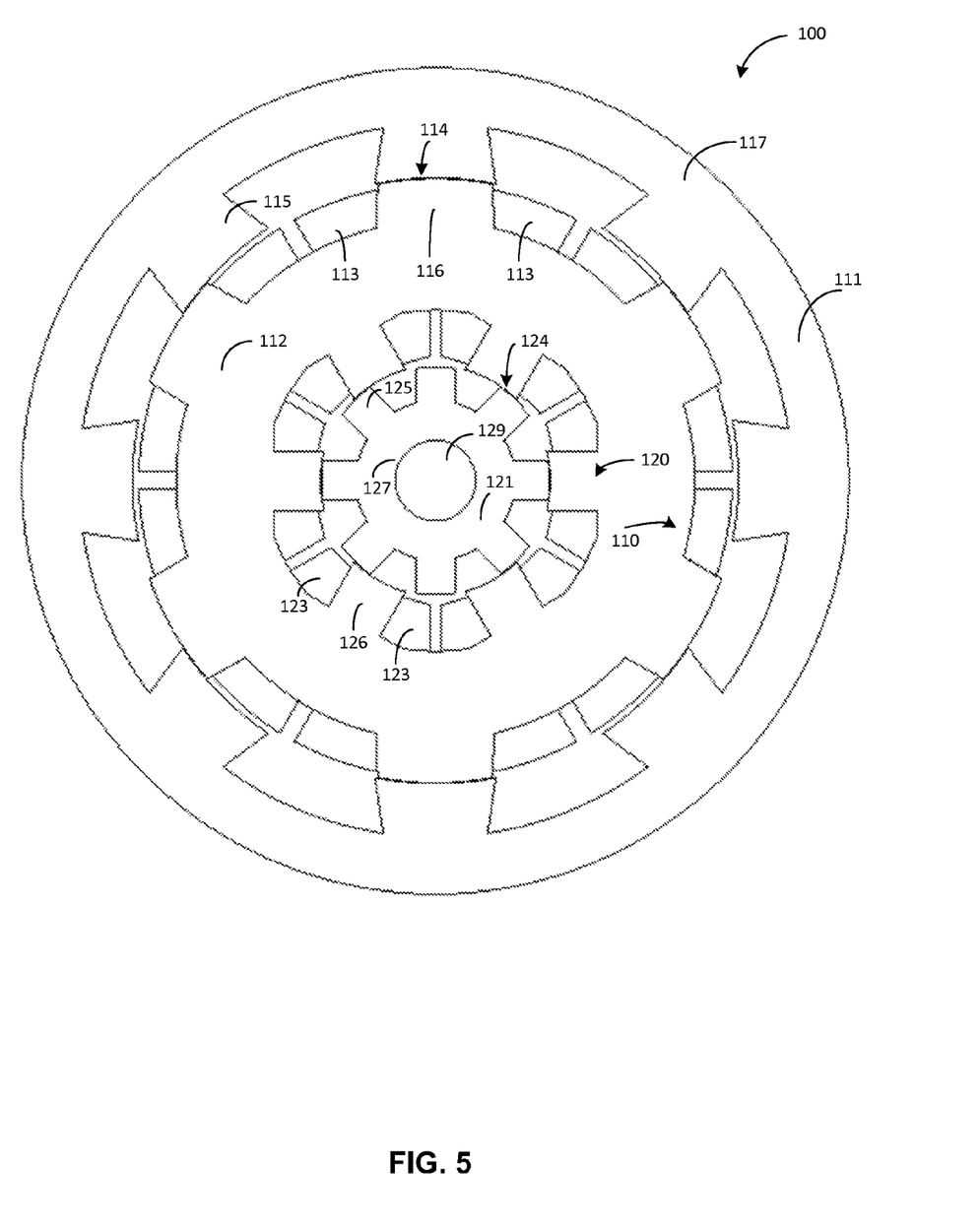
FIG. 5 is a schematic axial cross-section view of a double-rotor switched reluctance machine in accordance with another example embodiment.

In FIGS. 1A and 4, stator poles 116 are generally radially aligned with stator poles 126. Alternatively, as shown in FIG. 5, the stator poles 116, 126 may be radially offset (i.e. not radially aligned). Operating electric machines 110, 120 at the same electrical frequency and with the rotors 111, 121 in the relative position shown in FIG. 5 (i.e. aligned) but with offset stator poles 116, 126 may result in output torque profiles for electric machines 110, 120, and an overall torque profile for the double-rotor switched reluctance machine 100 as shown in FIG. 3B.

For the double-rotor switched reluctance machine configurations shown in FIGS. 1A and 4, the exterior and interior electric machines have the same number of rotor and stator poles (i.e. electric machines 110 and 120 are both 6/8 SRMs). Accordingly, for electric machines 110 and 120 to operate at a common electrical frequency, rotors 111 and 121 have to run at the same rotational speed (e.g. at the same revolutions per minute, or RPM). However, in embodiments where the interior electric machine does not have the same rotor/stator pole configuration as the exterior electric machine, operating the electric machines 110, 120 at a common electrical frequency may require the rotors 111, 121 to operate at different RPMs. For example, for the double-rotor switched reluctance machine illustrated in FIG. 2, since the exterior rotor 111 has twice the number of rotor poles of the interior rotor 121, and there are the same number of stator poles 116, 126 (i.e. interior electric machine is a 6/4 SRM, and exterior electric machine is a 6/8 SRM), the interior rotor 121 has to run at twice the RPMs as exterior rotor 111 for interior electric machine 120 to operate at the same electrical frequency as exterior electric machine 110.

Generally speaking, for double-rotor switched reluctance machine configurations where operating the electric machines 110, 120 at a common electrical frequency requires the rotors to operate at a common RPM, the relative angular positions of the rotors may be expressed as:

$$\theta_2 = \theta_1 + \theta_{offset} \quad (2)$$

where $\theta_1$ is the angular position of the rotor of the first electric machine, $\theta_2$ is the angular position of the rotor of the second electric machine, and $\theta_{offset}$ is a predetermined angular offset (based on e.g. the double-rotor switched reluctance machine configuration) to be maintained between the rotors.

For double-rotor switched reluctance machine configurations where operating the electric machines 110, 120 at a common electrical frequency requires the rotors to operate at different RPMs, the relative angular positions of the rotors may be expressed as:

$$\theta_2 = c(\theta_1) + \theta_{offset} \quad (3)$$

where c is a constant based on the speed ratio to be maintained between the rotors. For example, if the first rotor has to rotate twice as fast as the second rotor for the electric machines to operate at the same electrical frequency, c is equal to ½.

One way to maintain a desired offset between the output torque profiles for the exterior and interior electric machines is to mechanically synchronize rotors 111 and 121 to maintain a desired relative alignment of the rotors. For example, the two rotors may be coupled to each other and/or to a common output shaft with the rotors radially offset from each other by a predetermined offset angle selected to provide a desired overall torque ripple for the double-rotor switched reluctance machine 100.

In double-rotor switched reluctance machine configurations where rotors 111 and 121 have to run at a common rotational speed for electric machines 110 and 120 to operate at a common electrical frequency, the two rotors may be coupled directly to each other and/or directly to a common output shaft.

In double-rotor switched reluctance machine configurations where rotors 111 and 121 have to run at different rotational speeds for electric machines 110 and 120 to operate at a common electrical frequency, the two rotors may be coupled to each other and/or to a common output shaft so that a predetermined ratio between the rotational speeds of the rotors is maintained. For example, for the double-rotor switched reluctance machine illustrated in FIG. 2, the rotors may be mechanically synchronized so that the interior rotor completes two revolutions for every one revolution of the exterior rotor. It will be appreciated that the rotors may be coupled to each other in any suitable fashion, e.g. via one or more reduction gears, and/or at least one of the two rotors may be coupled to a common output shaft via one or more reduction gears.

Another way to maintain a desired offset between the output torque profiles for the exterior and interior electric machines is to electrically control machines 110 and 120 to maintain a desired relative alignment of rotors 111 and 121. For example, the two electric machines may be operated using the same current excitation frequency, or a predetermined ratio between the current excitation frequencies may be maintained so that a predetermined ratio between the rotational speeds of the rotors is maintained.

Figure 6:
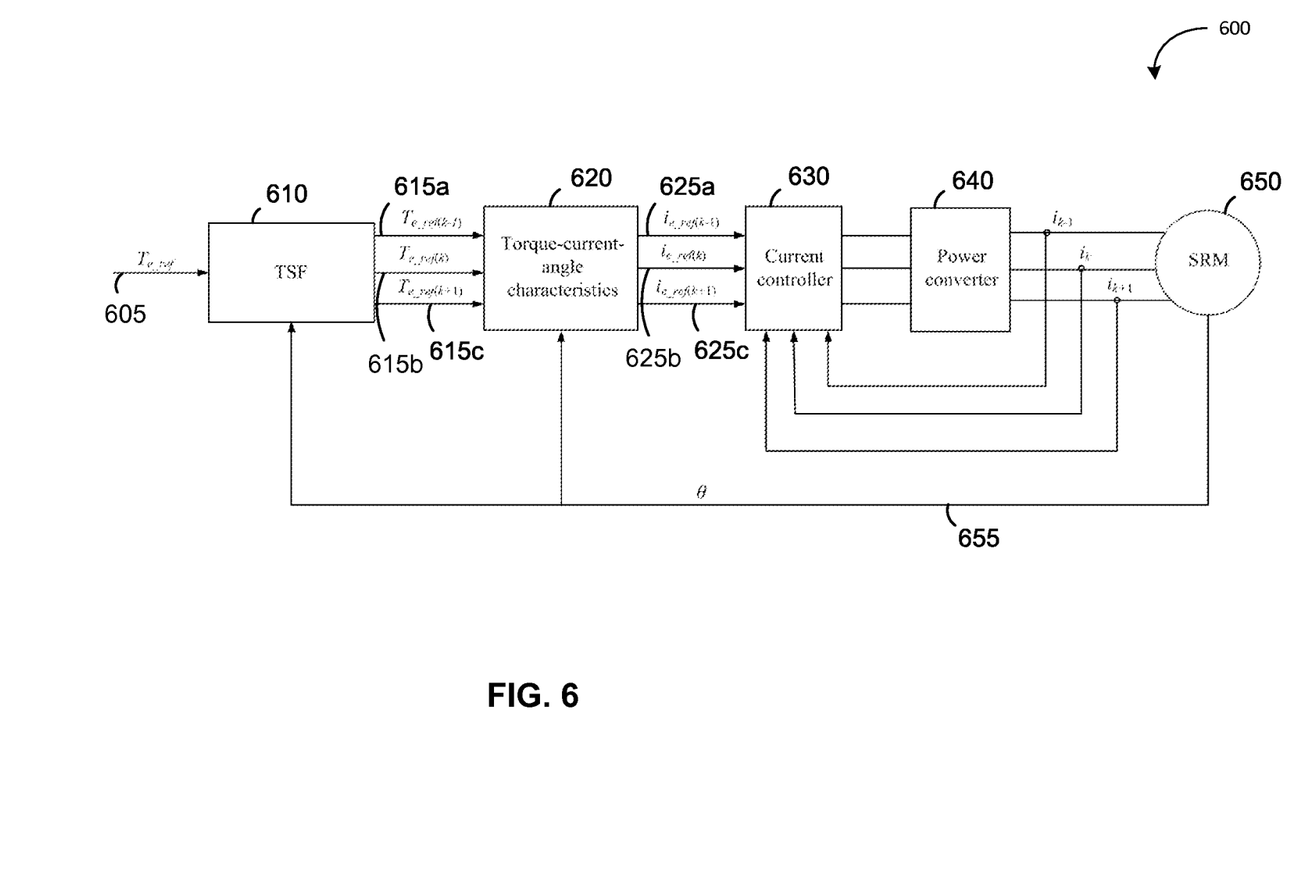
FIG. 6 is a schematic SRM torque control diagram in accordance with at least one example embodiment.

An example schematic SRM torque control diagram 600 is shown in FIG. 6. This example is provided for illustration only, and other control systems and/or methods may be used to control e.g. switched reluctance machines 110, 120. In the illustrated example, an input (or desired) torque reference 605 is distributed to three phases based on values determined using a torque sharing function (TSF) 610 for a given rotor position θ. These individual phase torque references 615a, 615b, and 615c (as defined by the TSF) are then converted to phase current references 625a, 625b, 625c according to torque-current-rotor position characteristics 620 of the SRM motor 650. Finally, the phase current is controlled by a hysteresis controller 630. A power converter 660 may be provided.

It will be appreciated that the individual phase torque references 615a, 615b, and 615c for a given torque reference 605 and rotor position θ may be pre-determined and stored in one or more look-up tables, for example using a field-programmable gate array (FPGA), a digital signal processor (DSP), and/or other suitable controller.

Similarly, the phase current reference (e.g. 625a, 625b, 625c) for a given phase torque reference (e.g. 615a, 615b, and 615c) and rotor position θ may be pre-determined and stored in one or more look-up tables, for example using a FPGA or other suitable controller.

Also, in some embodiments, the torque-current-rotor position characteristics 620 may be taken into consideration when determining individual phase current references 625a, 625b, and 625c based on the TSF. For example, three look-up tables—from which an individual phase current reference (e.g. 625a, 625b, 625c) can be retrieved for an individual phase torque reference (e.g. 615a, 615b, and 615c) and rotor position θ—may be used.

In the example control system illustrated in FIG. 6, the phase current reference is a function of a desired output torque and rotor position θ. Accordingly, for a double-rotor switched reluctance machine employing such a control system for one or both electric machines 110, 120, the relative positions of rotor 111 and 121 could be compared (e.g. by a central controller, or by a controller for machine 110 or 120) and if the relative angular positions of the rotors is determined to vary from a predetermined offset angle, the rotational speed of one or both rotors may be temporally adjusted (increased or decreased) to return the rotors to the predetermined offset angle.

In addition to torque ripple, during the operation of switched reluctance machines an unbalanced radial force is typically present. This radial force is typically the result of an eccentricity of the machine rotor stator assembly (e.g. due to manufacturing tolerances), which leads to a non-uniform air gap between the rotor and the stator. A location with a smaller air gap distance yields a higher radial force pulling the rotor towards the stator than a location with a higher air gap distance, and vice versa. It will be appreciated that the location of the higher radial force rotates as the rotor rotates relative to the stator, resulting in a moving force that may generate vibration and/or noise, or otherwise impair the performance of the switched reluctance machine.

Figure 7A:
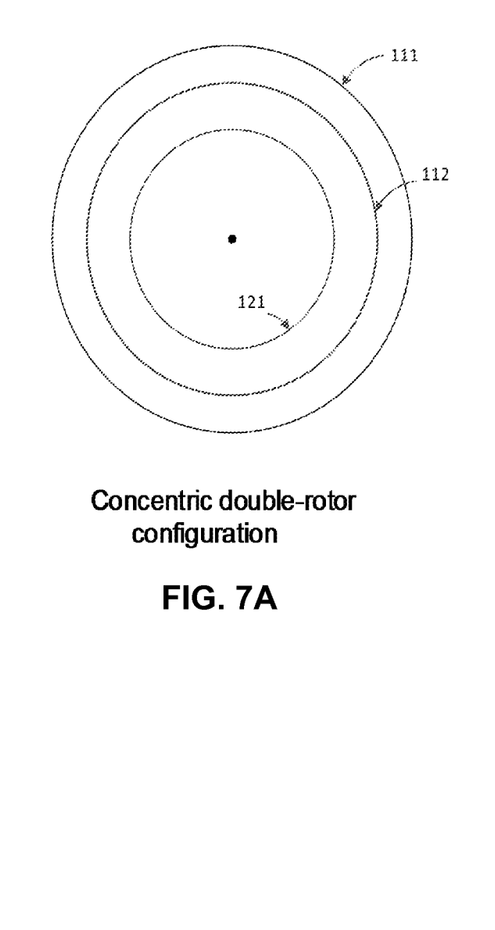
FIG. 7A is a schematic axial cross-section view of a double-rotor switched reluctance machine in which the rotors and the stator are perfectly concentric.
Figure 7B:
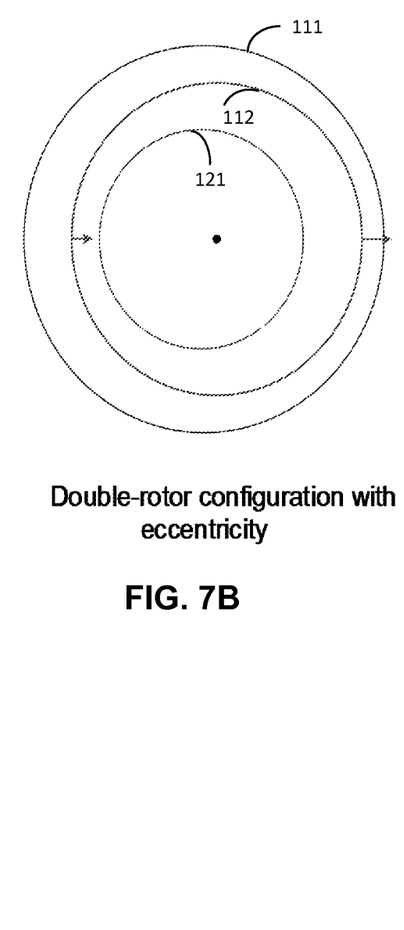
FIG. 7B is a schematic axial cross-section view of a double-rotor switched reluctance machine in which the rotors and the stator are eccentric.
Figure 7C:
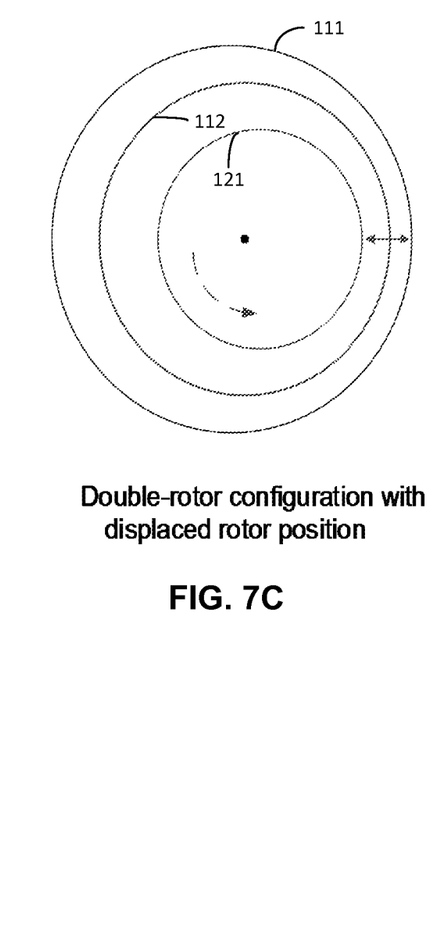
FIG. 7C is a schematic axial cross-section view of the double-rotor switched reluctance machine of FIG. 7B in which the interior rotor has been rotated.

As shown schematically in FIGS. 7A-C, in a double-rotor switched reluctance machine 100, there are two air gaps 114 and 124. Since the stator 112 is nested between the two rotors 111 and 121, the net radial force acting on the stator 112 is a combination of the radial force from the exterior machine 110 and the interior machine 120. Accordingly, when the rotors are rotating at a common rotational speed (i.e. are in a fixed relative position), the net radial force can be reduced (e.g. partially or completely balanced) by selecting the relative position of the two rotors 111 and 121 to reduce or minimize the net variance in the air gaps 114, 124.

In FIG. 7A, the rotors are perfectly concentric with each other and with the stator. Accordingly, the air gaps in the inner and outer electric machines are constant, and there is no net radial force. While such a configuration is theoretically possible, it may not always be achieved.

For example, in FIG. 7B, the interior machine 120 has a smaller air gap on the left side, which results in rotor 121 pulling the stator 112 towards the right side. The exterior machine 110 has a smaller air gap on the right side, which results in rotor 111 pulling the stator 112 towards the right side as well, thus adding to the net radial force exerted on the stator of the double-rotor electric machine 100.

In FIG. 7C, the interior rotor 121 has been rotated while the exterior rotor 111 has not, so that the interior machine 120 has a smaller air gap on the right side, which results in rotor 121 pulling the stator 112 towards the left side. The exterior machine 110 still has a smaller air gap on the right side, which results in rotor 111 pulling the stator 112 towards the right side. Thus the net radial force on the stator 112 is reduced or balanced between the interior machine 120 and the exterior machine 110. This may reduce or eliminate wobble, noise and/or vibration of the double-rotor electric machine 100.

To selecting a relative position of the two rotors and to reduce or minimize the net variance in the air gaps, the eccentricity of each electric machine may be determined independently (e.g. by operating one electric machine while the other electric machine is stopped), and a preferred relative position may be determined to reduce or minimize the net forces expected based on the determined eccentricities. Alternatively, both electric machines may be operated concurrently, and during operation the relative position of the rotors may be varied (e.g. by electrically over- or under-speeding one rotor) while the net radial force is measured (e.g. using an accelerometer mounted to the stator) to determine the relative rotor position that leads to a reduced (e.g. minimized) net radial force. It will be appreciated that instead of (or in addition to) measuring the net radial force on the stator, the overall wobble and/or vibration of the double-rotor switched reluctance machine may be measured to infer the net radial force.

In double-rotor switched reluctance machine configurations where rotors 111 and 121 have to run at a common rotational speed for electric machines 110 and 120 to operate at a common electrical frequency, the rotors may be configured to reduce both torque ripple and radial force imbalances. In this respect, depending on the stator/rotor pole configurations of the first and second electric machines, there will often be a plurality of relative rotor positions that may be used to reduce the overall torque ripple of the double-rotor switched reluctance machine. For example, for an eight-pole SRM driven by a three-phase power supply (which may be characterized as a 24 stroke SRM), the peak instantaneous torque is expected to occur 24 times (e.g. at 24 different mechanical angles) per revolution of the rotor relative to the stator. Thus, there may be 24 different possible mechanical angles between the stator and the rotor that at which the peak instantaneous torque is produced. Accordingly, each of these mechanical angles may be used to temporally offset the peak instantaneous torque for that electric machine relative to a peak instantaneous torque generated by the other electric machine in a double-rotor electric machine. However, as shown in FIG. 7C, there may only be one mechanical angle between the rotors that results in a minimal net radial force. Accordingly, one may select the one of the plurality of mechanical angles suitable to offset the peak instantaneous torque that is closest to the mechanical angle that results in a minimal net radial force, in order to reduce both torque ripple and net radial force.

It will be appreciated that in some embodiments, one may select a mechanical angle that is between an angle that would be optimal to reduce torque ripple and an angle that would be optimal to minimize net radial force, to provide a tradeoff between torque ripple reduction and net radial force reduction.

The various embodiments described herein may have applications in the fields of hybrid electric vehicle powertrain, hybrid electric aircraft powertrain, hybrid ship powertrain, or some other electro-mechanical integrated transmission to serve as the electric prime mover and receiver. The various embodiments described herein may further have applications in hybrid electric and plug-in hybrid electric vehicles, such as, for example, cars, SUVs, trucks, motorbikes, etc., to replace the existing or conventional motor and generators in transmissions power train.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that variations are possible in variant implementations and embodiments.

The invention claimed is:

1. A double-rotor switched reluctance machine comprising:
   a stator, a first rotor, and a second rotor;
   the stator and the first rotor configured to operate as a first electric machine having an output torque profile that, for a first average output torque, fluctuates periodically between a first maximum instantaneous torque and a first minimum instantaneous torque as the first rotor rotates relative to the stator;
   the stator and the second rotor configured to operate as a second electric machine having an output torque profile that, for a second average output torque, fluctuates periodically between a second maximum instantaneous torque and a second minimum instantaneous torque as the second rotor rotates relative to the stator;
   the double-rotor switched reluctance machine configured so that when the first and second electric machines are operated at a common electrical frequency, the first and second maximum instantaneous torques are temporally offset, thereby reducing an overall torque ripple of the double-rotor switched reluctance machine.

2. The double-rotor switched reluctance machine of claim 1, wherein when the first and second electric machines are operated at the common electrical frequency, the first maximum instantaneous torque and the second minimum instantaneous torque are substantially temporally concurrent.

3. The double-rotor switched reluctance machine of claim 1 or claim 2, wherein the first rotor is coupled to the second rotor so that the first and second electric machines operate at the common electrical frequency.

4. The double-rotor switched reluctance machine of claim 3, wherein the first rotor is coupled to the second rotor so that the first and second electric machines operate at a common rotational speed.

5. The double-rotor switched reluctance machine of claim 1 or claim 2, further comprising a controller for controlling the first and second electric machines, the controller operable to selectively synchronize the first and second electric machines to operate at the common electrical frequency.

6. The double-rotor switched reluctance machine of claim 5, wherein the controller comprises a first controller for controlling the first electric machine, and a second controller for controlling the second electric machine.

7. The double-rotor switched reluctance machine of claim 1, wherein the second rotor is nested within the first rotor.

8. The double-rotor switched reluctance machine of claim 7, wherein the first rotor is nested within the stator.

9. The double-rotor switched reluctance machine of claim 7, wherein the stator is nested between the first rotor and the second rotor.

10. The double-rotor switched reluctance machine of claim 1, further configured so that when the first and second electric machines are operated at a common rotational speed, the first and second rotors are radially offset from each other by a predetermined offset angle selected to reduce a net radial force imposed on the stator by the operation of the first and second electric machines.

11. The double-rotor switched reluctance machine of claim 10, wherein the predetermined offset angle is selected to minimize the net radial force imposed on the stator by the operation of the first and second electric machines.

12. A double-rotor switched reluctance machine comprising:
a stator, a first rotor, and a second rotor, the stator and the first rotor configured to operate as a first electric machine, and the stator and the second rotor configured to operate as a second electric machine;
the double-rotor switched reluctance machine configured so that when the first and second electric machines are operated at a common rotational speed, the first and second rotors are radially offset from each other by a predetermined offset angle selected to reduce a net radial force imposed on the stator by the operation of the first and second electric machines.

13. The double-rotor switched reluctance machine of claim 12, wherein the predetermined offset angle is selected to minimize the net radial force imposed on the stator by the operation of the first and second electric machines.

14. A method for controlling a double rotor switched reluctance machine comprising a stator, a first rotor, and a second rotor, the stator and the first rotor configured to operate as a first electric machine, and the stator and the second rotor configured to operate as a second electric machine, the method comprising:
operating the first electric machine at an electrical frequency to generate a first average output torque, the first electric machine having an output torque profile that fluctuates periodically between a first maximum instantaneous torque and a first minimum instantaneous torque as the first rotor rotates relative to the stator;
operating the second electric machine at the electrical frequency to generate a second average output torque, the second electric machine having an output torque profile that fluctuates periodically between a second maximum instantaneous torque and a second minimum instantaneous torque as the second rotor rotates relative to the stator; and
synchronizing the operation of the first and second electric machines so that the first and second maximum instantaneous torques are temporally offset, thereby reducing an overall torque ripple of the double-rotor switched reluctance machine.

15. The method of claim 14, wherein synchronizing the operation of the first and second electric machines comprises operating the first and second electric machines so that the first maximum instantaneous torque and the second minimum instantaneous torque are substantially temporally concurrent.

16. The method of claim 14, wherein synchronizing the operation of the first and second electric machines comprises coupling the first rotor to the second rotor so that the first and second electric machines operate at the electrical frequency.

17. The method of claim 14, wherein synchronizing the operation of the first and second electric machines comprises using a controller operable to selectively synchronize the first and second electric machines to operate at the electrical frequency.

18. The method of claim 14 or claim 15, further comprising synchronizing the operation of the first and second electric machines so that the first and second rotors are radially offset from each other by a predetermined offset angle selected to reduce a net radial force imposed on the stator by the operation of the first and second electric machines.

19. A method for controlling a double rotor switched reluctance machine comprising a stator, a first rotor, and a second rotor, the stator and the first rotor configured to operate as a first electric machine, and the stator and the second rotor configured to operate as a second electric machine, the method comprising:
operating the first electric machine and the second electric machine at a common rotational speed; and
synchronizing the operation of the first and second electric machines so that the first and second rotors are radially offset from each other by a predetermined offset angle selected to reduce a net radial force imposed on the stator by the operation of the first and second electric machines.

20. The method of claim 19, wherein the predetermined offset angle is selected to minimize the net radial force imposed on the stator by the operation of the first and second electric machines.

* * * * *